(12) United States Patent
Spangenberg et al.

(10) Patent No.: US 6,375,557 B1
(45) Date of Patent: Apr. 23, 2002

(54) HAND-HELD ABRASIVE CUTTER WITH A SUCTION HOOD

(75) Inventors: Rolf Spangenberg, Gauting (DE); Louis Widmer, Ulisbach (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/563,577

(22) Filed: May 3, 2000

(30) Foreign Application Priority Data

May 20, 1999 (DE) .......................................... 199 23 145

(51) Int. Cl.[7] .............................................. B24B 27/08
(52) U.S. Cl. ........................................ 451/344; 451/359
(58) Field of Search .............................. 451/344, 359, 451/451, 456, 457; 125/13.01, 20

(56) References Cited

U.S. PATENT DOCUMENTS

| 5,033,192 A | * 7/1991 | Franz et al. ................ 30/124 |
| 5,433,008 A | 7/1995 | Barger et al. ................ 30/376 |

FOREIGN PATENT DOCUMENTS

| DE | 3941957 A | * 6/1991 | ............ B24B/27/06 |
| DE | 29604780 | 8/1998 | |
| EP | 340467 A2 | * 4/1989 | ............ B27G/19/04 |
| EP | 0340467 | 11/1989 | |
| EP | 429013 A2 | * 5/1991 | ............ B24B/27/08 |

* cited by examiner

Primary Examiner—Joseph J. Hail, III
Assistant Examiner—David B. Thomas
(74) Attorney, Agent, or Firm—Sidley Austin Brown & Wood, LLP

(57) ABSTRACT

A hand-held abrasive cutter for forming groove in a hard constructional component and including a guide member (2) for guiding the cutter along the constructional component, a hood (1) for covering a cutting-off disc (30) and connected with the guide member (20) by a common rotatable axle and pivotable in a direction of the guide member against a spring-biasing force, a stop member (3) associated with the hood (1) or the guide member (2) and displaceable, in its release position, along a plurality of locking elements (14) provided on the hood (1) or the guide member (2) and arranged one after another, with the stop member formlockingly engaging at lest one of the locking elements (14) in its locking position; and a locking member (2) displaceable, in the locking position of the stop member (3), in an operational region (W) of the stop member (3).

8 Claims, 2 Drawing Sheets

HAND-HELD ABRASIVE CUTTER WITH A SUCTION HOOD

BACKGROUND OF THE INVENTION

1. Field of the Invention

The present invention relates to a hand-held abrasive cutter for forming grooves in a hard constructional component, comprising a cutting-off disc, a guide member for guiding the cutter along the constructional component, a hood for covering the cutting-off disc and connected with the guide member by a common rotatable axle and pivotable in a direction of the guide member against a spring-biasing force, a stop member associated with the hood or the guide member, and a plurality of locking elements provided on the hood or the guide member and arranged one after another, with the stop member being displaceable, in its release position, along the locking elements and formlockingly engaging, in its locking position, at least one of the locking elements.

2. Description of the Prior Art

European Patent EP-O 340 467 discloses an abrasive cutter with a cutting-off disc for forming grooves in hard constructional components, e.g., such as concrete and stone components. The abrasive cutter is arranged in a hood and a guide member for safety reasons and for removing dust formed during cutting a groove. The abrasive cutter, together with the cutting-off disc, are arranged on the hood, with the axis of the cutter and the disc extending horizontally. A common axle connects the hood and the guide member. The hood is pivotable, against a spring-biasing force in a direction of the guide member until the hood abuts a stop member arranged on the guide member. The stop member is displaceable, in its release position, along a plurality of locking elements provided on the guide member and arranged one after another. A spring biases the stop member into engagement with the locking elements in its locking position.

To displace the stop member from its locking position into its release position, the stop member should be lifted from its engagement with the tooth-shaped locking elements against a spring-biasing force in order to break the form-locking connection of the stop member with the guide member. With a spring that applies a small biasing force, there exists a danger of shifting of the stop member from its predetermined position as a result of inadvertent displacement of the stop member during the placement of the cutter on a constructional component or the lifting of the cutter of the constructional component. This is a serious drawback as the shifting of the stop member leads to a deviation of the groove depth from a predetermined size.

Accordingly, an object of the present invention is a hand-held abrasive cutter with which grooves with a constant depth can be formed and in which an inadvertent shifting of the stop member from a predetermined position is prevented.

SUMMARY OF THE INVENTION

This and other objects of the present invention, which will become apparent hereinafter, are achieved by providing a locking member displaceable, in the locking position of the stop member, in the operational region of the stop member.

The locking member, which is displaced in the operational region of the stop member, prevents the stop member from displacement from its locking position to its release position, i.e., blocking of the stop member takes place. The locking member can be formed, e.g., as a shackle arranged sidewise of the stop member and displaceable, in the locking position of the stop member, immediately behind the stop member in its axial projection.

An easy displacement of the stop member along the locking elements is insured when both the stop member and the locking elements are provided on the hood.

The dimensions of the abrasive cutter can be made small when, advantageously, the stop member is displaceable along a bolt which is supported on the hood, and the locking member is also displaceable along the bolt relative to the stop member and is fixable on the bolt in the locking position of the stop member.

A simple and a cost-effective, from the manufacturing point of view, connection of the locking member with the bolt is preferably achieved when the locking member is connected with the bolt by a threaded connection.

Advantageously, a spring is provided between the locking member and the stop member. The spring biases the stop member into its locking position. In this way, the stop member is automatically displaced into its locking position as soon as its release position is broken. The force necessary for the displacement of the stop member into its release position depends on the spring force of the spring arranged between the stop member and the locking member. Because the spring is supported against the locking member, the biasing force applied to the stop member can be adjusted by adjusting the distance between the stop and locking members, i.e., the biasing force of the spring depends on this distance. E.g., at a larger distance between the locking and stop members, the spring is released to a great degree, and the stop member can be displaced to its released position by an application of a small force. At a smaller distance between the locking and stop members, the force necessary for the displacement of the stop member to its release position in much greater.

To achieve an easy movement of the spring and to be able to prevent its contamination, preferably, the spring at least partially is received in annular groove formed in the stop member and opening toward the locking member.

The hood and the guide member are connected with each other with a possibility of a pivotal movement relative to each other about a common rotable axle. In order to insure that the hood and the guide member can pivot only within each other and cannot be pivoted out of each other, the bolt advantageously is connected with a detent spring which is arranged on the hood and is formlockingly engageable with the guide member in the initial position of the hood, and is supported on the inner surface of the guide member in the operational position of the hood. The detent spring, e.g., can be arranged on the inner surface of the hood. To insure cooperation of the detent spring with the guide member, advantageously, the detent spring projects past the outer contour of the hood in the initial position of the hood, and is provided with a locking nose projecting in a recess formed in the inner surface of the guide member.

For changing the cutting-off disc, it should be readily accessible to a suitable tool. To this end, advantageously, the formlocking connection between the detent spring and the guide member is broken by displacement of the bolt. By displacing the bolt, the hood and the guide member can be displaced apart from each other by pivoting the guide member about the common axle away from the hood.

Advantageously, the guide member is provided with a window opening arranged in the circumferential regional of the cutting-off disc. The window opening permits an early detection of the wear and so-called "firing" of the cutting-off disc.

Two guiding rollers are provided coaxially with the common axle of the hood and the guide member. The guiding rollers, together with a guide surface which is provided on the guide member in its region remote from the hood, insure displacement of the cutter on a surface of to-be-cut constructional component. Preferably, the guiding rollers project beyond the guiding surface by about 1 mm.

At the upper portion of the hood remote from the guide member, there is provided a suction union or connection connectable with a suction device for sucking away a grinding dust formed during cutting of the groove. One suction union can be replaced by another union in order to connect the cutter with another suction device.

At opposite sides of the hood, there are provided two connection thread for connecting a handle to the hood. The two connection threads are coaxial with each other. The longitudinal axes of the threads extend parallel to the axis of the cutting-off disc.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
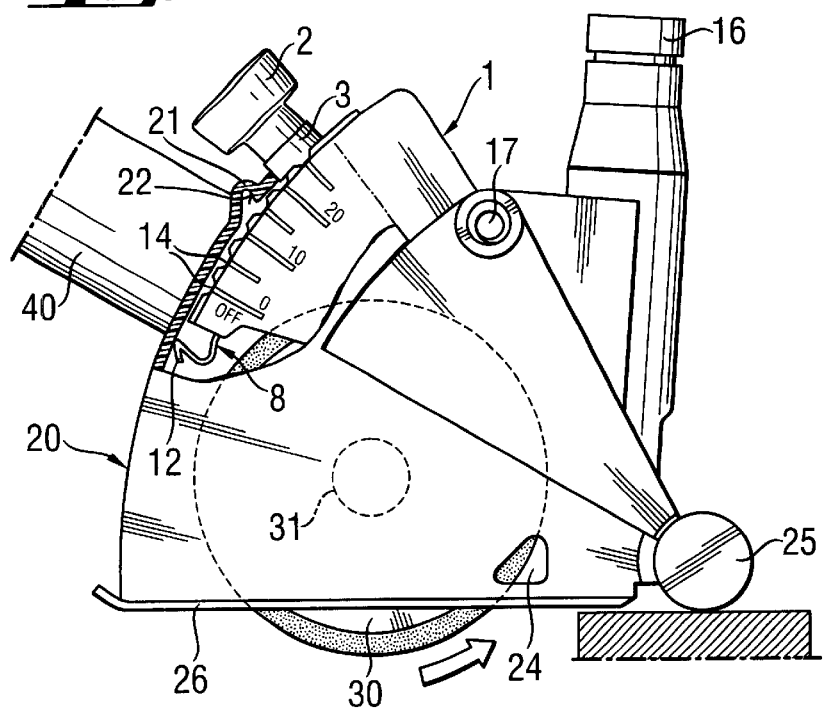
FIG. 1 a side, partially cross-view of a and-held abrasive cutter according to the present invention with a guide member and a hood.
Figure 2:
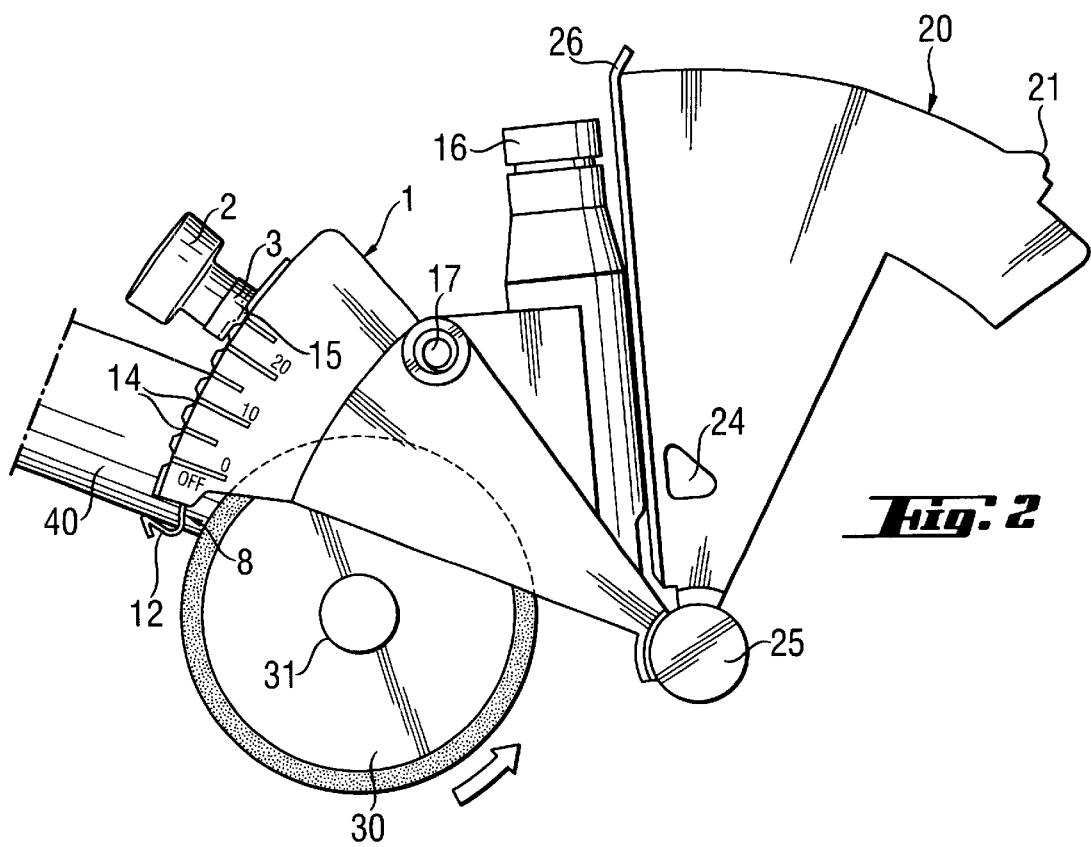
FIG. 2 a side view of the abrasive cutter shown in FIG. 1 with an open guide member.

An abrasive cutter according to the present invention, which is shown in FIGS. 1–2, includes a housing 40, shown only partially, and a cutting-off disc 30 which is mounted on a shaft, which also is not shown in. The shaft detail, projects from the housing 40. This cutting-off disc 30 is secured on the shaft with a clamp 31. The shaft extends transverse to a longitudinal extent of the housing 40, with the plane of the cutting-off disc 30 extending transverse to an outer surface of a to-be-cut constructional component, not shown.

In the interior of the housing 40, there is arranged an electric drive motor, likewise not shown, for driving the shaft and thereby the cutting-off disc 30 secured on the shaft. A hood 1, which partially covers the cutting-off disc 30, is secured to a flange, not shown in detail, provided on the housing 40.

The hood 1 is provided with a rotatable axle that extends parallel to the axis of the cutting-off disc 30. A guide member 20, which also partially covers the cutting-off disc 30, is secured on the hood axle. Both the hood 1 and the guide member 20 are formed as sectors of a circle. The hood 1 is pivoted about the axle against a biasing force of a spring, not shown, from its initial position to an operational position in which the hood 1 telescopically extends into the guide member 20, and the cutting-off disc 30 extends beyond a guide surface 26 of the guide member 20. The guide surface 26 is located at an end region of the guide member 20 remote from the hood 1.

On both sides of the rotatable axle, there are provided, respectively, guiding rollers 25 which, together with the guide surface 26, serve for displacing the abrasive cutter along the surface of the to-be-cut constructional component. Because the entire guide surface 26 does not completely about the surface of the to-be-cut constructional component, the outer contour of the guiding rollers 25 projects beyond the guide surface 26 by about from 0.5 to 1 mm.

The guide member 20 is provided, in the region of the notatable axle and the guide surface 26, with a side window 24 in a form of a through-opening. The window 24 permits an early detection of the wear of the cutting-off disc 30 and so-called "firing" of the cutting-off disc 30.

The hood 1 has two opposite connection threads 17 the longitudinal axes of which extend parallel to the drive shaft of the abrasive cutter and which serve for attachment of a side handle, not shown. The hood 1 is provided, in the circumferential region of the connection threads 17, with a suction connection 16 connectable, e.g., with a suction device, not shown.

As it is particularly shown in FIGS. 1–4, the arcuate outer profile of the hood 1 has a plurality of locking indentations 14 arranged, in the direction of the guide member 20 and one after another in a spaced relationship to each other. The locking indentations 14 serve, e.g., for receiving two opposite projections 15 of a stop member 3. Sidewise of the locking indentations 14, a scale is secured on the hood 1. The scale permits an operator to set the stop member 3 at a desired groove depth.

Figure 4:
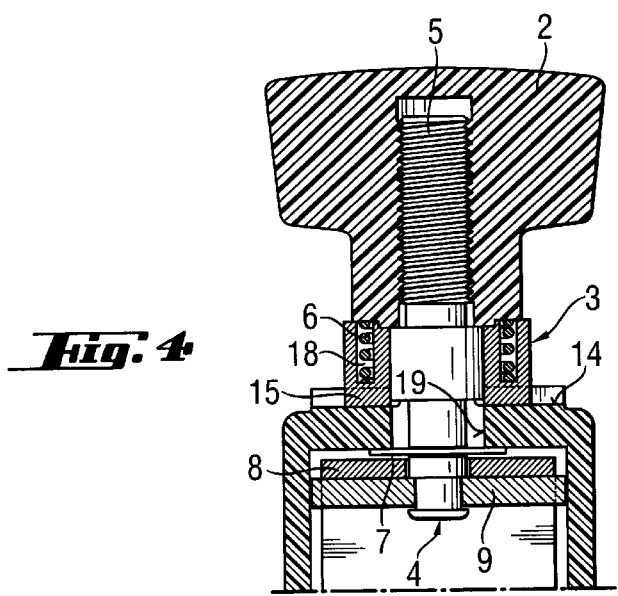
FIG. 4 a cross-sectional view, at an increased scale, of the hood along line iv—iv in FIG. 3

The stop member 3 has, as shown in FIG. 4, a shape of a sleeve and can be displaced along a bolt 4 which is connected, with aid of a thread 5, with a locking member 2 formed as a knob. The stop member 3 is supported on the locking member 2 by a spring 6 which partially extends into an annular groove 18 formed in the stop member 3 and opening toward the locking member 2.

Figure 3:
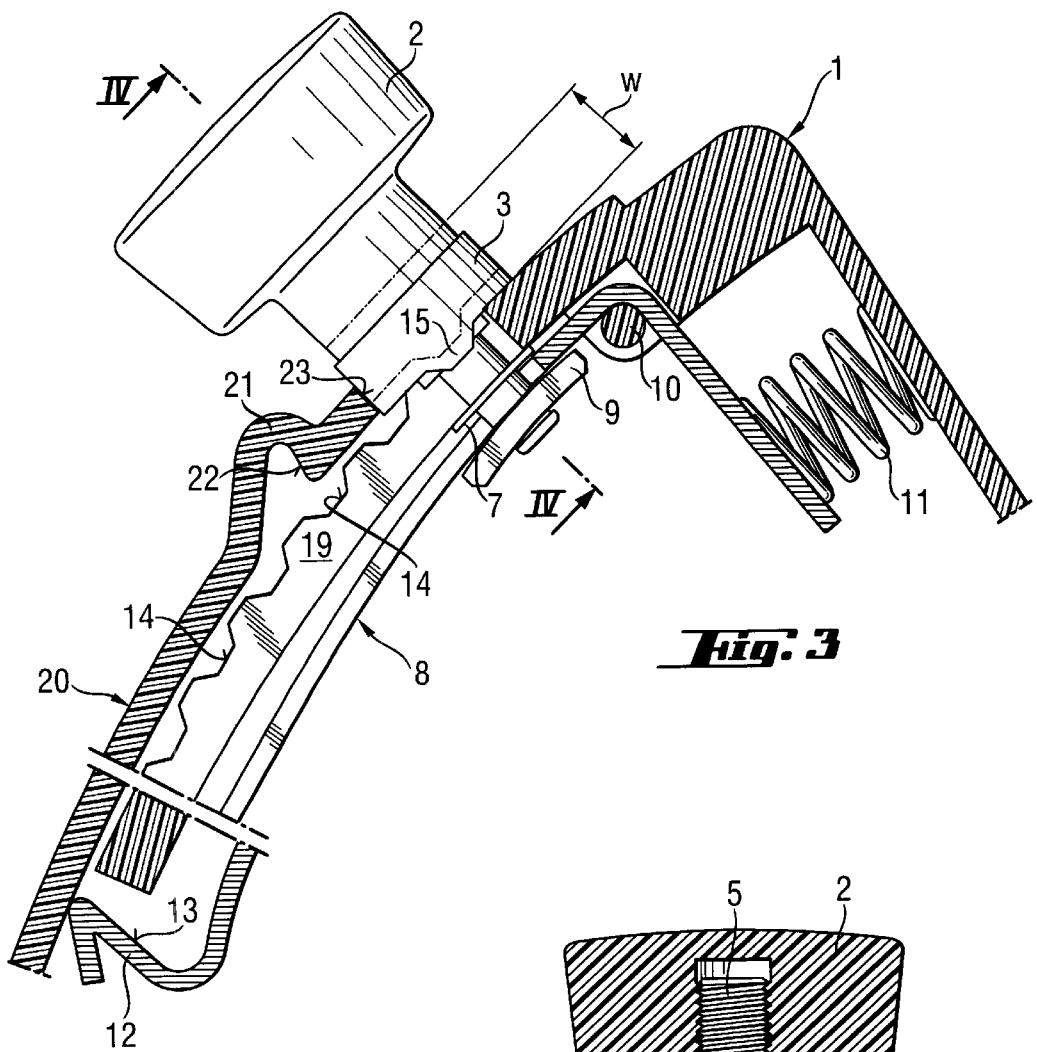
FIG. 3 a cross-sectional view, at an increased scale, of the hood and the guide member of the abrasive cutter shown in FIG. 1.

As shown in FIG. 3, the stop member 3 is in its locking position, and the lock member 2 extends in the operational region W of the stop member 3. The displacement of the stop member 3 to its release position, in which the projections 15 are disengaged from the locking indentations 14, is only then possible when the locking member 2 is displaced from the operational region W of the stop member 3, and the stop member 3 is pushed against the biasing force of the spring 6 in a direction toward the locking member 2.

The bolt 4, which carries both the stop member 3 and the locking member 2, extends through an opening 19 which is formed in the hood 1 and extends in the direction of the guide member 20. The bolt 4 and, thereby, the stop member 3 can be displaced along the opening 19 in the release position of the stop member 3. The groove depth depends on the position of the stop member 3 with respect to the hood 1 because the guide member 20 is supported, with its stop surface 23, against the stop member 3.

Because the hood 1 can only be pivoted into the guide member 20, and pivoting of the guide member is prevented, the bolt 4, e.g., can be connected with an elastic detent spring 8 provided on the hood 1. The detent spring 8 is formlockingly connected with the guide member 20 in the initial position of the hood 1 and, in the operational position of the hood 1, is supported against the inner contour of the guide member 20.

The detent spring 8 is secured on the inner surface of the hood 1, e.g., with a retaining ring 10. In order to insure the cooperation of the detent spring 8 with the guide member 20, in the initial position of the hood 1, the detent spring 8 is biased by a spring 11, which is supported against the inner surface of the hood 1, into a position in which it projects past the outer contour of the hood 1. The detent spring 8 has a locking nose 12 that extends, in the initial position of the hood 1, into a recess 21 formed in the guide member, with the stop surface 13 of the locking nose 12 engaging the stop surface 22 of the recess 21.

For changing the cutting-off disc 30, which is arranged in the hood 1 and the guide member 20, it should be readily accessible. To this end, e.g., the bolt 4 is connected with the detent spring 8 with the aid of safety ring 7 and an end piece 9. This connection insures an easy release of the formlocking connection of the bolt 4 with the detent spring 8 by an axial displacement of the bolt 4. Upon breaking of the connection of the bolt 4 with the detent spring 8, the hood 1 and the guide member can be displaced relative to each other by pivoting the guide member 20 about the rotatable axle away from the hood 1.

Accordingly, through the present invention was shown and described with references to the preferred embodiments, such are merely illustrative of the present invention and are not to be construed as a limitation thereof, and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A hand-held abrasive cutter for forming grooves in a hard constructional component, comprising a cutting-off disc (30); a guide member (20) for guiding the cutter along the constructional component; a hood (1) for covering the cutting-off disc (30); a common rotatable axle for connecting the hood (1) with the guide member (20) and pivotable in a direction of the guide member (20); means for limiting a pivotal movement of the hood (1) in the direction of the guide member (20) whereby a groove depth is determined, the limiting means comprising a stop member (3) having a locking position corresponding to the groove depth and a release position, and a plurality of locking elements (14) provided on one of the hood (1) and the guide member (20) and arranged one after another, the stop member (3) being displaceable, in the release position thereof, along the locking elements (14) and formlockingly engaging at least one of the locking elements (14) in the locking position thereof; and a locking member (2) extending, in the locking position of the stop member (3), in an operational region (W) of the stop member (3), wherein the limiting means further comprises a bolt (4) supported on the hood (1) for supporting the stop member (3) for displacement along the bolt (4), the locking memebr (2) being supported on the bolt (4) for displacement therealong relative to the stop member (3) and fixable on the bolt (4) in a locking position of the stop member.

2. A hand-held abrasive cutter according to claim 1, wherein both the stop member (3) and the locking elements (14) are provided on the hood (1).

3. A hand-held abrasive cutter according to claim 1, wherein the locking member (2) is connectable with the bolt (4) by a threaded connection.

4. A hand-held abrasive cutter according to claim 1, further comprising an elastic detent spring (8) arranged on the hood (1) and formlockingly engageable with the guide member (20) in an initial position of the hood (1) and supported on an inner surface of the guide member (20) in an operational position of the hood (1), and wherein the bolt is connected with the detent spring (8).

5. A hand-held abrasive cutter accordingly to claim 4, wherein the detent spring (8) projects past an outer contour of the hood (1) in an initial position of the hood (1) and has a locking nose (12) projecting in a recess (21) formed in the guide member (20) in the initial position of the hood (1).

6. A hand-held abrasive cutter accordingly to claim 5, wherein the formlocking engagement of the detent spring (8) with the guide member (2) is releasable upon an axial displacement of the bolt (4).

7. A hand-held abrasive cutter for forming grooves in a hard constructional component, comprising a cutting-off disc (30); a guide member (20) for guiding the cutter along the constructional component; a hood (1) for covering the cutting-off disc (30); by a common rotatable axle for connecting the hood (1) with the guide member (20) and pivotable in a direction of the guide member against a spring-biasing force; means for limiting a pivotal movement of the hood (1) in the direction of the guide member (20) whereby a groove depth is determined, the limiting means comprising a stop member (3) having a locking position corresponding to the groove depth and a release position, and a plurality of locking elements (14) provided on one of the hoods (1) and the guide member (20) and arranged one after another, the stop member (3) being displaceable, in a release position thereof, along the locking elements (14) and formlockingly engaging at least one of the locking elements (14) in the locking position thereof; a locking member (2) extending, in the locking position of the stop member (3), in an operational region (W) of the stop member (3); a spring (6) arranged between the stop member (3) and the locking member (2) for biasing the stop member (3) into the locking position thereof, the spring (6) being located, at least partially, in an annular groove formed in the stop member (3) and opening toward the locking member (2).

8. A hand-held abrasive cutter for forming grooves in a hard constructional component, comprising a cutting-off disc (30); a guide member (20) for guiding the cutter along the constructional component; a hood (1) for covering the cutting-off disc (30); by a common rotatable axle for connecting the hood (11) with the guide member (20) and pivotable in a direction of the guide member against a spring-biasing force; means for limiting a pivotal movement of the hood (1) in the direction of the guide member (20) whereby a groove depth is determined, the limiting means comprising a stop member (3) having a locking position corresponding to the groove depth and a release position, and a plurality of locking elements (14) provided on one of the hoods (1) and the guide member (20) and arranged one after another, the stop member (3) being displaceable, in a release position thereof, along the locking elements (14) and formlockingly engaging at least one of the locking elements (14) in the locking position thereof; and a locking member (2) extending in the locking position of the stop member (3), in an operational region (W) of the stop member (3);

wherein the guide member (20) has a window opening (24) provided in a circumferential region of the cutting-off disc (30).

* * * * *